US012253185B2

(12) United States Patent
Corcoran et al.

(10) Patent No.: US 12,253,185 B2
(45) Date of Patent: Mar. 18, 2025

(54) GAS VALVE ASSEMBLY

(71) Applicant: Planet Safety System Technologies LLC, Monroe, NY (US)

(72) Inventors: Brian M. Corcoran, Ridgewood, NJ (US); Michael W. Haynes, Hackensack, NJ (US)

(73) Assignee: Planet Safety System Technologies LLC, Monroe, NY (US)

( * ) Notice: Subject to any disclaimer, the term of this patent is extended or adjusted under 35 U.S.C. 154(b) by 0 days.

(21) Appl. No.: 17/813,179

(22) Filed: Jul. 18, 2022

(65) Prior Publication Data

US 2023/0021782 A1    Jan. 26, 2023

Related U.S. Application Data

(60) Provisional application No. 63/203,485, filed on Jul. 24, 2021.

(51) Int. Cl.
| | |
|---|---|
| *F16K 31/06* | (2006.01) |
| *F16K 1/14* | (2006.01) |
| *F16K 1/36* | (2006.01) |
| *F16K 1/42* | (2006.01) |
| *F16K 31/08* | (2006.01) |

(52) U.S. Cl.
CPC ............ *F16K 31/0675* (2013.01); *F16K 1/14* (2013.01); *F16K 1/36* (2013.01); *F16K 1/42* (2013.01); *F16K 31/0662* (2013.01); *F16K 31/082* (2013.01)

(58) Field of Classification Search
CPC ............. F16K 31/0675; F16K 31/0662; F16K 31/082; F16K 1/14; F16K 1/36; F16K 1/42
See application file for complete search history.

(56) References Cited

U.S. PATENT DOCUMENTS

| | | | | |
|---|---|---|---|---|
| 3,212,751 A | | 10/1965 | Hassa | |
| 3,233,625 A | * | 2/1966 | Pase | G01F 23/64 |
| | | | | 251/75 |
| 3,731,670 A | * | 5/1973 | Loe | A61F 6/24 |
| | | | | 128/831 |
| 4,253,493 A | * | 3/1981 | English | F16K 31/082 |
| | | | | 137/625.5 |
| 2016/0186880 A1 | * | 6/2016 | Bassmann | F16K 31/0662 |
| | | | | 251/129.15 |
| 2019/0100979 A1 | | 4/2019 | Noske et al. | |

FOREIGN PATENT DOCUMENTS

| | | |
|---|---|---|
| DE | 102009021639 A1 | 11/2010 |
| WO | 2015014795 A1 | 2/2015 |

OTHER PUBLICATIONS

International Search Report and Written Opinion, dated Oct. 13, 2022, 10 pages, issued in International Application PCT/US2022/073842.

\* cited by examiner

*Primary Examiner* — Eric Keasel
(74) *Attorney, Agent, or Firm* — AVEK IP, LLC

(57) ABSTRACT

A valve assembly consists essentially of a valve body having an inlet port and an outlet port; a valve retainer at least partially housed within the valve body; a valve poppet positioned within the valve body; a magnet affixed within the valve body near the valve body inlet port; and a solenoid coil mounted around the valve body.

17 Claims, 8 Drawing Sheets

GAS VALVE ASSEMBLY

CROSS-REFERENCE TO RELATED APPLICATIONS

This application claims the benefit of priority of U.S. Provisional Patent Application No. 63/203,485, which is titled "Gas Valve" and was filed on Jul. 24, 2021, the entire disclosure of which is incorporated by reference herein.

FIELD OF THE INVENTION

This application is related to gas valve assemblies. More particularly, the application is directed to simplified gas valve assemblies having a valve poppet and a solenoid coil for controlling the location of the valve poppet.

SUMMARY

The following presents a simplified summary of the disclosure in order to provide a basic understand of some aspects of the invention. This summary is not an extensive overview. It is not intended to identify critical elements of the invention or to delineate the scope of the invention. Its sole purpose is to present some concepts of the invention in a simplified form as a prelude to the more detailed description that is presented elsewhere herein.

According to one embodiment, a valve assembly consists essentially of a valve body having an inlet port and an outlet port; a valve retainer at least partially housed within the valve body; a valve poppet positioned within the valve body; a magnet affixed within the valve body near the valve body inlet port; and a solenoid coil mounted around the valve body.

In another embodiment, a valve assembly includes a valve body having an inlet port and an outlet port; a valve retainer at least partially housed within the valve body; a valve poppet positioned within the valve body; a magnet arranged within the valve body near the valve body inlet port; and a solenoid coil mounted around the valve body.

According to still another embodiment, method for operating a valve assembly first includes providing a valve assembly. The valve assembly consists essentially of a valve body having an inlet port and an outlet port and comprising a ledge and a valve seat; a magnet retainer within the valve body, the magnet retainer housing a magnet; a valve retainer at least partially housed within the valve body, wherein the valve retainer maintains the magnet retainer in position within the valve body; a seal positioned between the magnet retainer and the valve retainer; a valve poppet positioned within the valve body between the valve body outlet port and the magnet retainer; at least one pin extending through the magnet retainer to guide movement of the valve poppet; a solenoid coil mounted around the valve body, the solenoid coil being battery operated; and a micro charger for maintaining the life of the battery. The method further includes causing a pulse of electrical current of a first polarity to be sent to the solenoid coil, thereby inducing a first magnetic field. The first magnetic field causes the valve poppet to be temporarily magnetized such that the valve poppet is attracted to the magnet within the magnet retainer. The magnet holds the valve poppet at the magnet retainer such that the valve assembly is in an open configuration. Finally, the method includes causing a pulse of electrical current of a second polarity to be sent to the solenoid coil, thereby inducing a second magnetic field. The second magnetic field causes the valve poppet to be temporarily magnetized such that the valve poppet is repelled by the magnet within the magnet retainer. When repelled away from the magnet, the valve poppet sits atop the valve seat such that the valve assembly is in a closed configuration. In the open configuration, fluid is permitted to flow through the valve assembly. In the closed configuration, fluid is prevented from flowing through the valve assembly.

DETAILED DESCRIPTION

Electromechanical valves have been used for years. However, these valves are often complicated and are prone to failure, particularly if the valve is not operated according to the pressure rating of the valve. It would be helpful to have a valve that is exceedingly simple to produce and operate.

Figure 1:
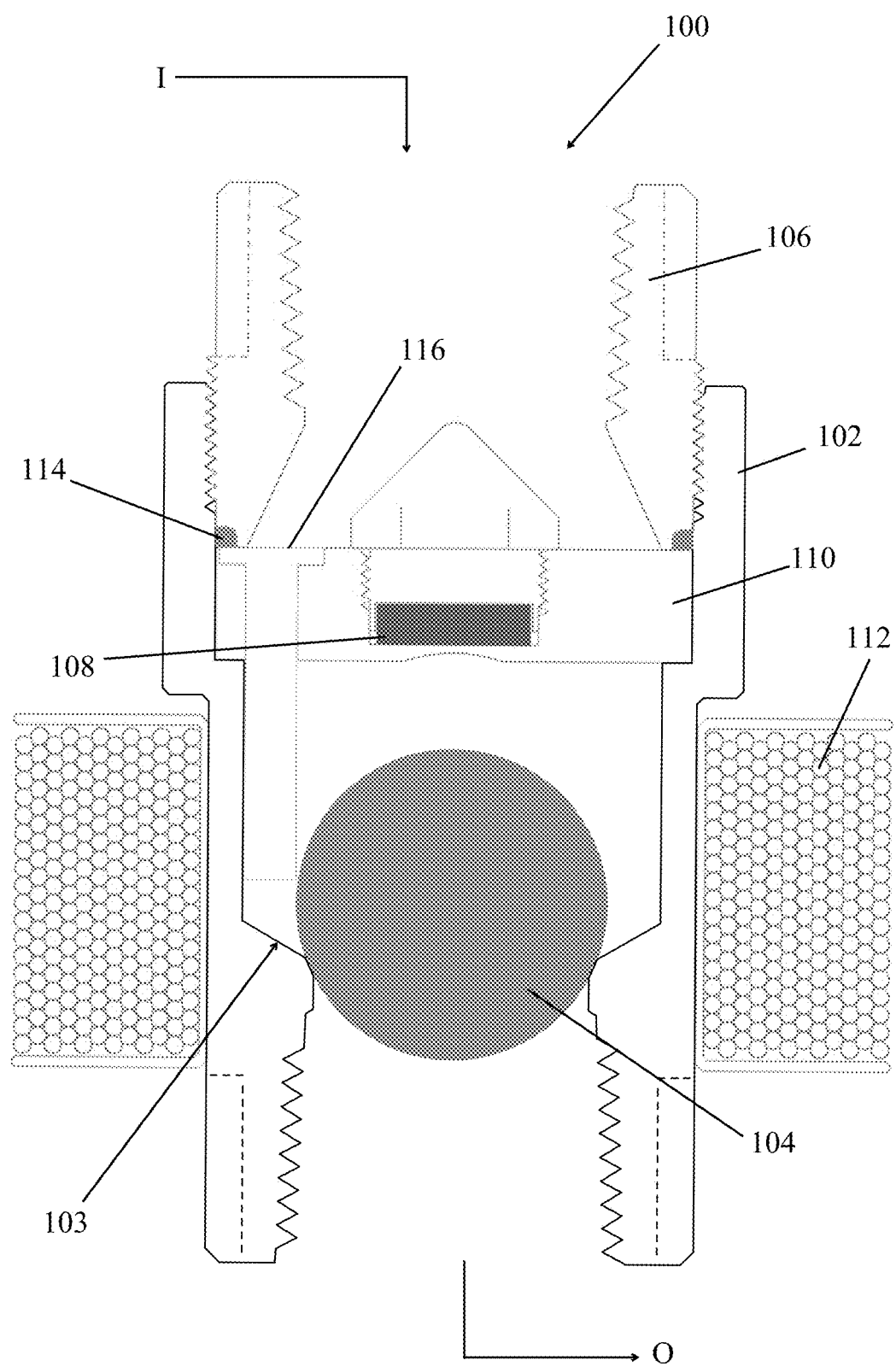
FIG. 1 is a cross-sectional view of a gas valve assembly in a closed position according to another embodiment of the invention.

With reference now to the figures, embodiments of gas valve assemblies are described. FIG. 1 shows a cross-sectional view of a gas valve assembly 100. The gas valve assembly 100 has an inlet end I, which is connected to a gas supply line, and an outlet end O where the gas exits the valve assembly 100. The valve assembly 100 consists essentially of a valve body 102, valve poppet 104, valve retainer 106, magnet 108, magnet retainer 110, and solenoid coil 112. The gas valve assembly 100 may include one or more guide pins 116. The gas valve assembly 100 may further include one or more seals 114 such as an O-ring type seal. Further, one or more retaining rings may be utilized to hold one or more of the gas valve components to or within the valve body 102.

Figure 2:
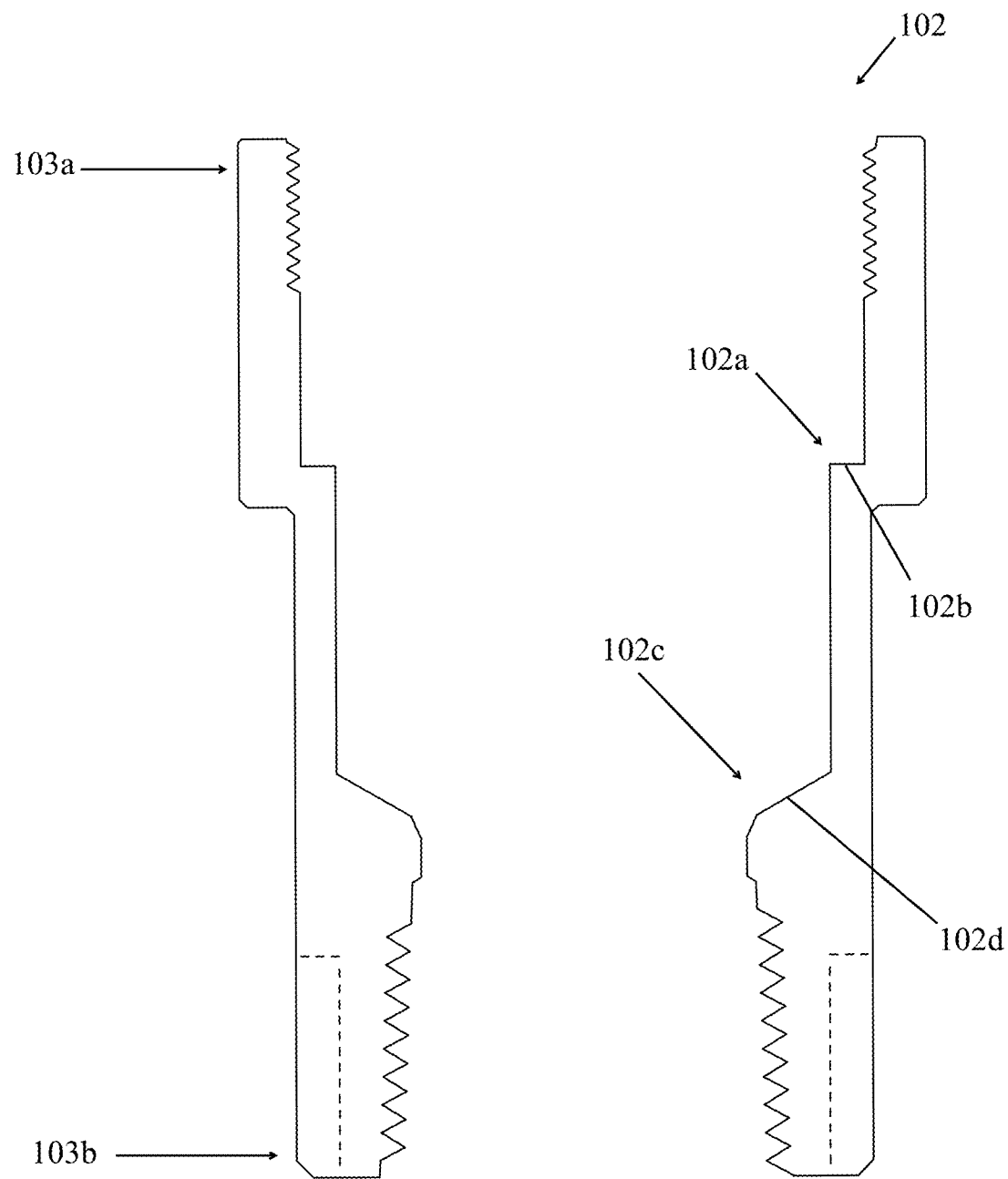
FIG. 2 is a detailed view of a valve seat of the gas valve assembly of FIG. 1.

FIG. 2 illustrates the valve body 102. The valve body 102 has an upper end 103a and a lower end 103b. The valve body 102 includes a ledge 102a and a valve seat 102c. The ledge 102a may extend partially, substantially, or entirely around the inner circumference near the upper end 103a of the valve body 102 and defines a substantially flat surface 102b. The valve seat 102c may also extend partially, substantially, or entirely around the inner circumference of the valve body 102. The valve seat 102c defines an angled surface 102d, wherein the angle is directed toward the lower end 103b of the valve body 102. Preferably, the valve body 102 is constructed from a non-magnetic material.

The valve poppet 104 sits within the valve body 102 atop the valve seat 102c. The valve poppet 104 may be, for example, a metal ball having ferromagnetic properties. In embodiments, the valve poppet 104 is a steel ball, although other ferromagnetic metals may be utilized.

Figure 3:
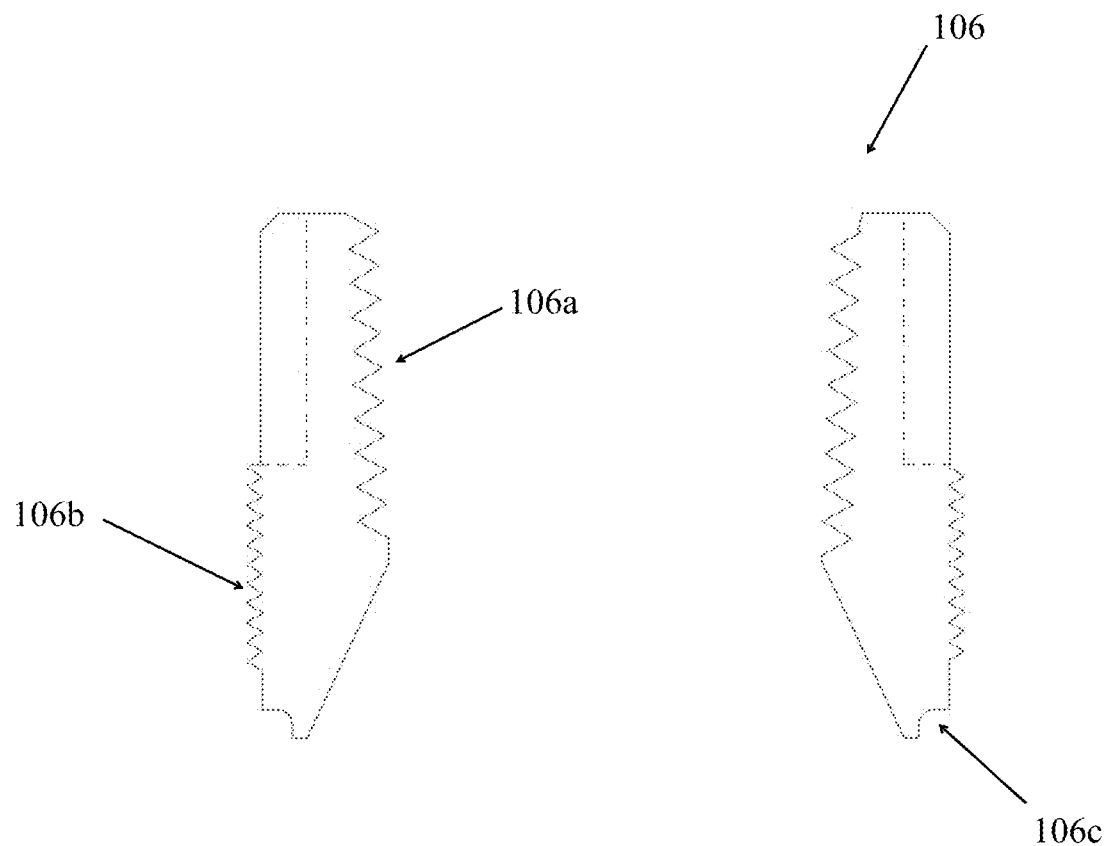
FIG. 3 is a detailed view of a valve retainer of the gas valve assembly of FIG. 1.

Moving on, FIG. 3 illustrates the valve retainer 106. The valve retainer 106 has inner threading 106a and outer threading 106b. The inner threading 106a allows the valve assembly 100 to connect to piping at the inlet end I. The outer threading 106b corresponds to threading at the upper end 103a of the valve body 102 and allows the valve retainer 106 to be joined to the valve body 102. A notch 106c in the valve retainer 106 provides an opening for a seal, such as an O-ring. As shown in FIG. 1, the seal 114 is located between the valve retainer 106 and the valve body 102 in an installed configuration.

Figure 4A:
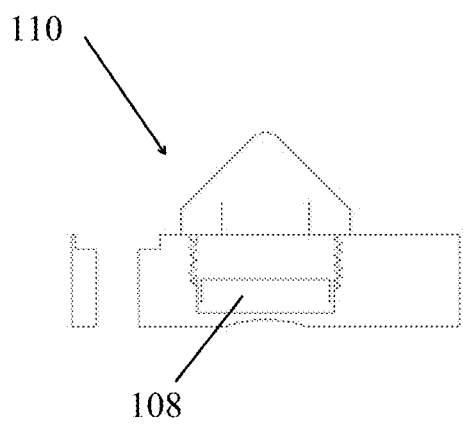
FIG. 4A is a detailed view of a magnet retainer assembly of the gas valve assembly of FIG. 1.
Figure 4B:
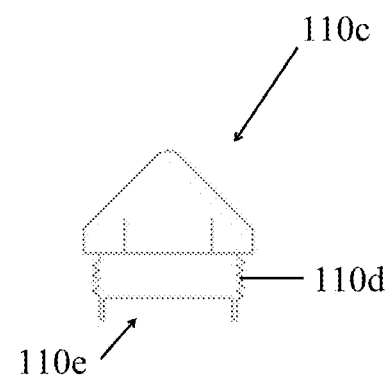
FIG. 4B is a detailed view of the magnet retainer cap of FIG. 4A.
Figure 4C:
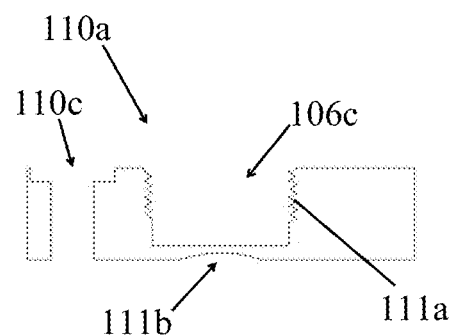
FIG. 4C is a detailed view of the magnet retainer magnet holder of FIG. 4A.

The magnet retainer 110 is shown generally in FIG. 4. The magnet retainer 110 includes a magnet holder 110a and a magnet holder cap 110b. With specific reference to FIG. 4C, the magnet holder 110a may include a magnet seat 111 configured to hold the magnet 108. An inside perimeter 111a of the magnet seat 111 may be threaded. A section 111b of the magnet seat 111 may be hollowed out or furrowed to allow magnetic forces to act through the magnet retainer 110.

Figure 5:
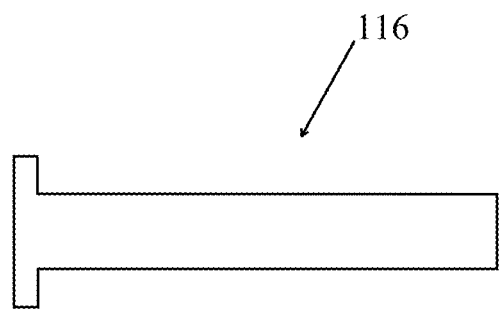
FIG. 5 is a detailed view of a guide pin of the gas valve assembly of FIG. 1.

The magnet holder 110a may include one or more holes 110b, each hole being configured to receive a pin 116 (see FIG. 5). The pins 116 may serve as guides to keep the poppet 104 centered within the valve body 102.

The magnet holder cap 110c is illustrated specifically in FIG. 4B, and may include corresponding threads 110d to secure the cap 110c to the magnet holder 110A. As illustrated in FIG. 4B, the magnet holder cap 110c may have a hollow interior 110e such that, when the cap 110c is mated with the magnet holder 110a, the magnet 108 fits at least partially within the hollow interior 110e.

The magnet 108 is preferably a permanent magnet.

As illustrated in FIG. 1, the magnet retainer 110 sits within the valve body 102 atop the ledge 102a. The valve retainer 106 mates with the valve body 102 (e.g., via the respective corresponding threadings) thereby holding the magnet retainer 110 in place. The magnet 108 sits within the magnet retainer 110, and specifically within the magnet seat 111, and is held in place by the magnet holder cap 110c.

The solenoid coil 112 is mounted around the valve body 102 as shown in FIG. 1. The solenoid coil 112 may be held in place with a retaining ring, such as a spiral-type retaining ring, for example.

In operation, the location of the poppet 104 defines whether the valve assembly 100 is open or closed. In a closed state, the poppet 104 rests on the valve seat 103 as shown in FIG. 1. The poppet 104 may be held in the closed position by gravity. In other words, the weight of the poppet 104 may keep the poppet 104 resting on the valve seat 103. Additionally, the pressure differential between the inlet port I and the output port O may help to maintain the valve assembly 100 in the closed position. In the closed position, gas cannot flow through the valve 100.

To move from the closed position to the open position, the valve poppet 104 is raised off the valve seat 103 and is held in the open position via the magnet 108. More specifically, when the position of the valve 100 is to be changed, a direct current pulse is sent to the solenoid coil 112. The coil 112 produces a magnetic field as the current passes through. And as the solenoid coil 112 surrounds the poppet 104, activation of the coil 112 causes the poppet 104 to briefly act as an electromagnet. In other words, the magnetic field produced within the coil 112 briefly magnetizes the valve poppet 104. As is known to those of skill in the art, the polarity of the current sent through the solenoid coil 112 determines whether the poppet 104 is attracted to, or repelled away from, the magnet 108. Therefore, if it desired to move the poppet 104 towards the magnet 108, current, of proper polarity, is sent through the coil 112 causing the poppet 104 to be briefly magnetized. The poppet 104 is only magnetized when an electric current moves through the coil 112. The magnetic field produced within the poppet 104 allows the poppet 104 to be attracted to the magnet 108. This attraction is strong enough to cause the poppet 104 to move off the valve seat 103, and the magnet 108 is strong enough to hold the poppet 104 in the open position. The magnet 108 will hold the poppet 104 indefinitely. In the open position, gas is allowed to flow through the valve 100.

To move the valve 100 back into the closed position, a brief pulse of current, of the correct polarity, is sent through solenoid coil 112. This will again cause the poppet 104 to briefly act as an electromagnet. In this case, the polarity of the current through the coil 112 is such that the poppet 104 has the same polarity as the magnet 108. This causes a repellent force between the magnet 108 and the poppet 104, which forces the poppet 104 back toward the valve seat 103. Once the poppet 104 is seated on the valve seat 103, the natural attractive force of the magnet 108 is insufficient to attract the poppet 104 as the poppet 104 is no longer magnetized.

The valve assembly 100 is designed for simple manufacture and operation. Accordingly, the valve 100 may rely on gravity, as described above, to keep the poppet 104 in the valve seat 103 in the closed position. In embodiments where the valve 100 relies on gravity, the valve 100 may be mounted in a substantially vertical position with the inlet port I generally at the top and the outlet port O generally at the bottom. The valve 100 may be used in a primarily stationary application, and may but need not necessarily be limited to low pressure applications.

In embodiments, the valve 100 may be configured such that a second permanent magnet (e.g., of opposite polarity from the permanent magnet 108) retains the poppet 104 in the closed position. For example, a second permanent magnet (which may be a single magnet or a plurality of magnets) may be positioned on or within the valve body 102 substantially adjacent the valve seat 103. The second permanent magnet may be particularly useful where it is desirable to mount the valve 100 in a horizontal rather than a vertical position. Additionally, if fluid flow is in an atypical direction, e.g., from low to high instead of high to low, the valve 100 may be flipped such that the outlet port O is at the top and the inlet port I is at the bottom.

Figure 6:
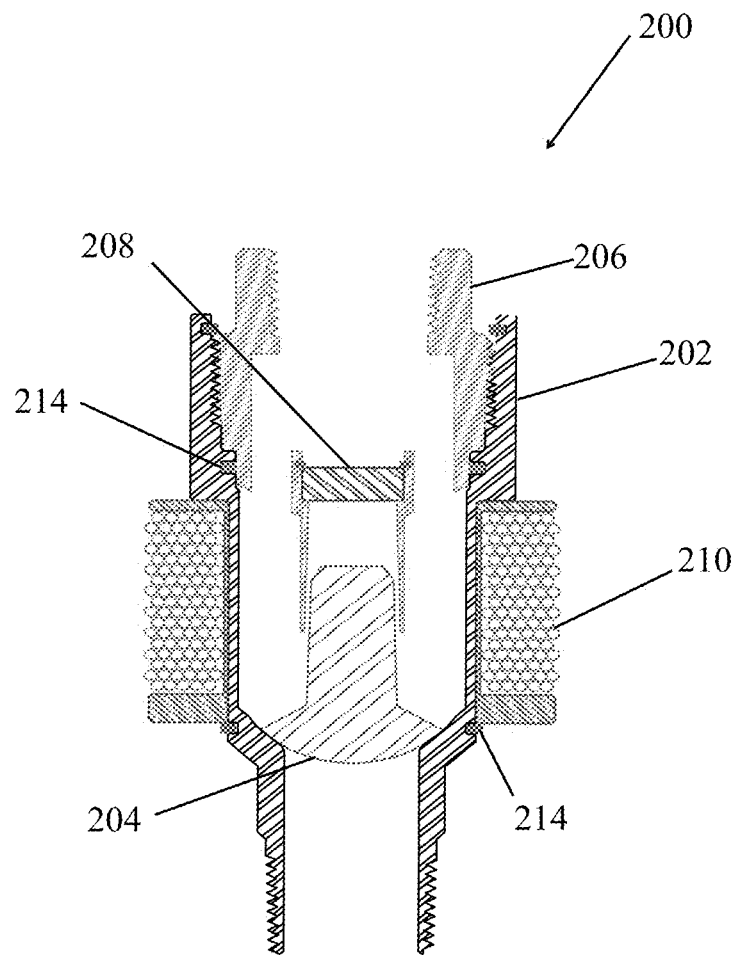
FIG. 6 is a cross-sectional view of a gas valve assembly in a closed position according to an embodiment of the invention.
Figure 7:
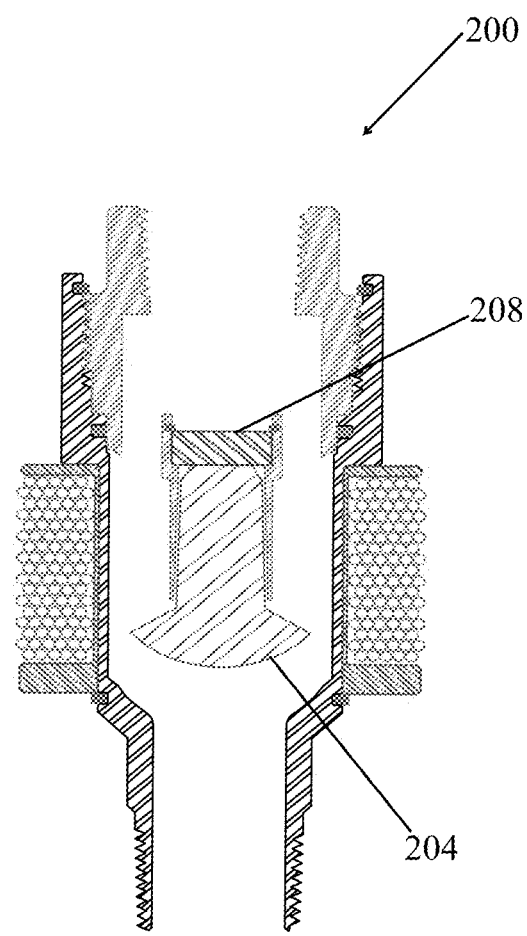
FIG. 7 is a cross-sectional view of the gas valve assembly of FIG. 6 in an open position.

FIGS. 6-7 illustrate a cross-sectional view of a gas valve assembly 200 which is substantially similar to the gas valve 100 except as specifically noted and/or shown, or as would be inherent. Further, those skilled in the art will appreciate that the embodiment 100 (and thus embodiment 200) may be modified in various ways, such as through incorporating all or part of any of the various described embodiments. For uniformity and brevity, reference numbers between 200 and 299 may be used to indicate parts corresponding to those discussed above numbered between 100 and 199 (e.g., valve body 202 corresponds generally to valve body 102), though with any noted or shown deviations.

The gas valve assembly 200 consists essentially of a valve body 202, valve poppet 204, valve retainer 206, magnet 208, and solenoid coil 212. The gas valve assembly 200 may further include one or more seals 214, such as an O-ring type seal. Further, one or more retaining rings may be utilized to hold one or more of the gas valve components on or within the valve body 202. Particularly, a retaining ring may be used to secure the solenoid 210 to the valve body 202.

Figure 8:
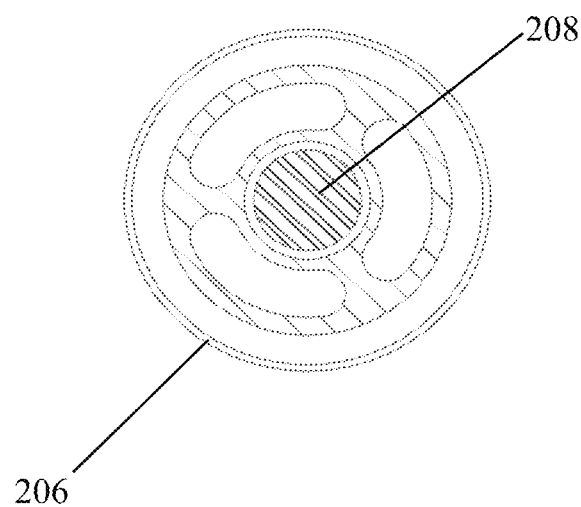
FIG. 8 is a bottom view of valve retainer of the gas valve assembly of FIG. 6.

The gas valve assembly 200 in FIG. 6 is shown in a closed position. Conversely, FIG. 7 shows the gas valve assembly 200 in an open position. FIG. 8 is a bottom view of the valve retainer 206.

Operation of the gas valve assembly 200 is substantially the same as operation of the gas valve assembly 100. Moreover, as with gas valve assembly 100, the gas valve assembly 200 may incorporate additional magnets 208 such that the valve 200 can be used in a reverse (e.g., upside-down) configuration and/or horizontally.

The valve assembly 100, 200 may be utilized in a meter system, such as a system for monitoring and controlling the flow of gas or water. The valve assembly 100, 200 may be used in other systems, including any system that utilizes a valve to control fluid flow.

In embodiments, the solenoid coil 112, 212 may be battery operated. To maintain the health of the batteries, the valve assembly 100, 212 may be equipped with a micro charger. The micro charger may be connected to a power source as is known to those of skill in the art. In further embodiments, the solenoid coil 112, 212 may be powered by alternating current (e.g., via hardwire to a building's power supply). Preferably, though not necessarily, the coil 112, 212 may be wired for 110 volt operation.

The flow of current may be controlled automatically or deliberately by a user via a software system. Accordingly, the valve assembly 100, 200 may be equipped with various features that allow for operable connection with the software system. The artisan will understand that the valve embodiments 100, 200 disclosed herein may include or have associated therewith electronics (e.g., a computing system, data servers, one or more processors, etc., executing one or more lines of code). The electronics may be used to control and modify the operation of the valve 100, 200 or components thereof (e.g., directing a motor and/or actuator function). In some example embodiments, processor or processors may be configured through particularly configured hardware, such as an application specific integrated circuit (ASIC), field-programmable gate array (FPGA), etc., and/or through execution of software to allow the valve assembly 100, 200 to function in accordance with the disclosure herein. Likewise, the valve assembly 100, 200 may make use of a graphical user interface, or other kind of machine-to-human interface, to carry out embodiments of the functions and features described herein. The processor may include any processor used in smartphones and/or other computing devices, including an analog processor (e.g., a Nano carbon-based processor). In certain embodiments, the processor may include one or more other processors, such as one or more microprocessors, and/or one or more supplementary co-processors, such as math co-processors.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. It will be understood that certain features and subcombinations are of utility and may be employed without reference to other features and subcombinations and are contemplated within the scope of the disclosure.

What is claimed is:

1. A valve assembly, consisting essentially of:
a valve body having an inlet port and an outlet port;
a valve retainer extending from the valve body and configured to threadably engage with a pipe section;
a valve poppet positioned within the valve body;
a magnet positioned within the valve body between the poppet and the valve retainer; and
a solenoid coil mounted to the valve body;
wherein the valve body and the valve retainer are each constructed of a non-magnetic material; and
wherein the valve poppet is constructed of a magnetic material.

2. The valve assembly of claim 1, wherein the valve body comprises a ledge defining a substantially flat surface, and a valve seat defining an angled surface, wherein the ledge and the valve seat are integrally formed as part of the valve body.

3. The valve assembly of claim 2, wherein the valve poppet rests against the valve seat when the valve assembly is in a closed configuration.

4. The valve assembly of claim 1, wherein the solenoid coil is configured to receive an electrical current, whereby receipt of the current causes the valve poppet to be temporarily magnetized.

5. The valve assembly of claim 4, wherein:
the valve poppet is attracted to, or repelled by, the magnet based on a polarity of the electrical current received by the solenoid coil;
the valve poppet is attracted to the magnet to cause the valve assembly to be in an open configuration; and
the valve poppet is repelled by the magnet to cause the valve assembly to be in a closed configuration.

6. A valve assembly, comprising:
a valve body having an inlet port and an outlet port;
a valve retainer threadably coupled to and extending from the valve body and configured to threadably engage with a pipe section;
a valve poppet positioned within the valve body;
a magnet arranged within the valve body;
a magnet retainer arranged within the valve body, wherein the magnet retainer holds the magnet; and
a solenoid coil mounted to the valve body.

7. The valve assembly of claim 6, wherein the valve body comprises a ledge defining a substantially flat surface, and a valve seat defining an angled surface.

8. The valve assembly of claim 7, wherein the magnet retainer sits atop the valve body ledge and is held into place by the valve retainer.

9. The valve assembly of claim 8, wherein a seal is disposed between the valve retainer and the magnet retainer.

10. The valve assembly of claim 6, wherein each of the valve body, the magnet retainer, and the valve retainer are formed of a non-magnetic material, and wherein the valve poppet is formed of a magnetic material.

11. The valve assembly of claim 10, wherein the solenoid coil is configured to receive an electrical current, whereby receipt of the current causes the valve poppet to be temporarily magnetized.

12. The valve assembly of claim 11, wherein:
the valve poppet is attracted to, or repelled by, the magnet based on a polarity of the electrical current received by the solenoid coil;
the valve poppet is attracted to the magnet to cause the valve assembly to be in an open configuration; and
the valve poppet is repelled by the magnet to cause the valve assembly to be in a closed configuration.

13. The valve assembly of claim 6, wherein the magnet retainer comprises a magnet seat and a cap, the magnet being held into position in the magnet seat by the cap.

14. The valve assembly of claim 6, wherein the magnet retainer comprises an opening for receiving a pin, wherein the pin extends through the magnet retainer within the valve body and guides movement of the valve poppet.

15. The valve assembly of claim 6, wherein the solenoid coil is configured to receive an electrical current, whereby receipt of the current causes the valve poppet to be temporarily magnetized.

16. The valve assembly of claim 15, wherein:
the valve poppet is attracted to, or repelled by, the magnet based on a polarity of the electrical current received by the solenoid coil;
the valve poppet is attracted to the magnet to cause the valve assembly to be in an open configuration; and
the valve poppet is repelled by the magnet to cause the valve assembly to be in a closed configuration.

17. A method for operating a valve assembly, comprising:
providing a valve assembly, the valve assembly consisting essentially of:
  a valve body having an inlet port and an outlet port and comprising a ledge and a valve seat;
  a magnet retainer within the valve body, the magnet retainer housing a magnet;
  a valve retainer at least partially housed within the valve body, wherein the valve retainer maintains the magnet retainer in position within the valve body;
  a seal positioned between the magnet retainer and the valve retainer;
  a valve poppet positioned within the valve body between the valve body outlet port and the magnet retainer;
  at least one pin extending through the magnet retainer to guide movement of the valve poppet;
  a solenoid coil mounted around the valve body, the solenoid coil being battery operated; and
  a micro charger for maintaining the life of the battery;
causing a pulse of electrical current of a first polarity to be sent to the solenoid coil, thereby inducing a first magnetic field, wherein:
  the first magnetic field causes the valve poppet to be temporarily magnetized such that the valve poppet is attracted to the magnet within the magnet retainer; and
  the magnet holds the valve poppet at the magnet retainer such that the valve assembly is in an open configuration;
causing a pulse of electrical current of a second polarity to be sent to the solenoid coil, thereby inducing a second magnetic field, wherein:
  the second magnetic field causes the valve poppet to be temporarily magnetized such that the valve poppet is repelled by the magnet within the magnet retainer; and
  the valve poppet sits atop the valve seat such that the valve assembly is in a closed configuration;
wherein, in the open configuration, fluid is permitted to flow through the valve assembly, and in the closed configuration, fluid is prevented from flowing through the valve assembly.

* * * * *